April 29, 1952 G. P. CASTNER ET AL Re. 23,481

WASHING MACHINE WITH CENTRIFUGAL EXTRACTOR AND STABILIZER THEREFOR

Original Filed Aug. 14, 1946 6 Sheets-Sheet 1

Inventors
GEORGE P. CASTNER
ARTHUR D. LUND

By Carlson & Hazle
Attorneys

April 29, 1952 G. P. CASTNER ET AL Re. 23,481

WASHING MACHINE WITH CENTRIFUGAL EXTRACTOR AND STABILIZER THEREFOR

Original Filed Aug. 14, 1946 6 Sheets-Sheet 2

Inventors
GEORGE P. CASTNER
ARTHUR D. LUND

By Carlson & Hagle

Attorneys

April 29, 1952 G. P. CASTNER ET AL Re. 23,481

WASHING MACHINE WITH CENTRIFUGAL EXTRACTOR AND STABILIZER THEREFOR

Original Filed Aug. 14, 1946 6 Sheets-Sheet 3

Inventors
GEORGE P. CASTNER
ARTHUR D. LUND

By Carlson & Hayle
Attorneys

April 29, 1952 G. P. CASTNER ET AL Re. 23,481

WASHING MACHINE WITH CENTRIFUGAL EXTRACTOR AND STABILIZER THEREFOR

Original Filed Aug. 14, 1946 6 Sheets-Sheet 4

Inventors
GEORGE P. CASTNER
ARTHUR D. LUND

By Carlson & Hagle
Attorneys

April 29, 1952 G. P. CASTNER ET AL Re. 23,481

WASHING MACHINE WITH CENTRIFUGAL EXTRACTOR AND STABILIZER THEREFOR

Original Filed Aug. 14, 1946 6 Sheets-Sheet 5

Inventors
GEORGE P. CASTNER
ARTHUR D. LUND

By Carlson + Hagle
Attorneys

Inventors
GEORGE P. CASTNER
ARTHUR D. LUND

By Carlson + Hagle
Attorneys

Reissued Apr. 29, 1952 Re. 23,481

UNITED STATES PATENT OFFICE 23,481

WASHING MACHINE WITH CENTRIFUGAL EXTRACTOR AND STABILIZER THEREFOR

George P. Castner, Webster City, Iowa, and Arthur D. Lund, Minneapolis, Minn., assignors to Solar Corporation, Milwaukee, Wis., a corporation of Delaware Original No. 2,513,844, dated July 4, 1950, Serial No. 690,532, August 14, 1946. Application for reissue September 20, 1950, Serial No. 185,898

14 Claims. (Cl. 68—23)

Matter enclosed in heavy brackets [ ] appears in the original patent but forms no part of this reissue specification; matter printed in italics indicates the additions made by reissue.

This invention relates to clothes washing machines, particularly of the general type used for domestic purposes, and the main object is to provide a comparatively simple, efficient, and practical machine for washing, rinsing, and drying the clothes and other articles to be laundered.

A further and more specific object is to provide a novel construction of machine in which, when properly adjusted and set, the various operations can be carried out automatically and in predetermined time sequence.

A further object is to provide a washer of the agitator type with means for introducing water to the washing tub in such manner as to increase the washing and rinsing efficiency while also removing the sediment and scum from the cleansing and rinsing fluids.

A further object is to so design the washing machine that the entire operating structure, including the tub, agitator, and operating mechanism, will be supported on a cushioned center pivot construction, with *freedom for limited gyratory deflection from a vertical axis, during the centrifuging or drying operation, but with* supplemental means for *efficiently* supporting such operating structure in *a* yieldable, *well* balanced *and stabilized,* operating position.

A further object is to provide a machine in which the washing receptacle may be rapidly rotated to centrifugally dry the clothes, and a spinning mechanism, including a fluid drive coupling, that will not only prevent overloading of the spinner motor during the starting operation, when load resistance is greatest, but will also function to retard spinning speed of the receptacle when the same is subjected to eccentric vibration due to unbalanced load condition in the clothes receptacle.

Still further and more specific objects will be disclosed in the course of the following specification, reference being had to the accompanying drawings, illustrating a preferred embodiment of the invention, and in which drawings.

Figure 1:
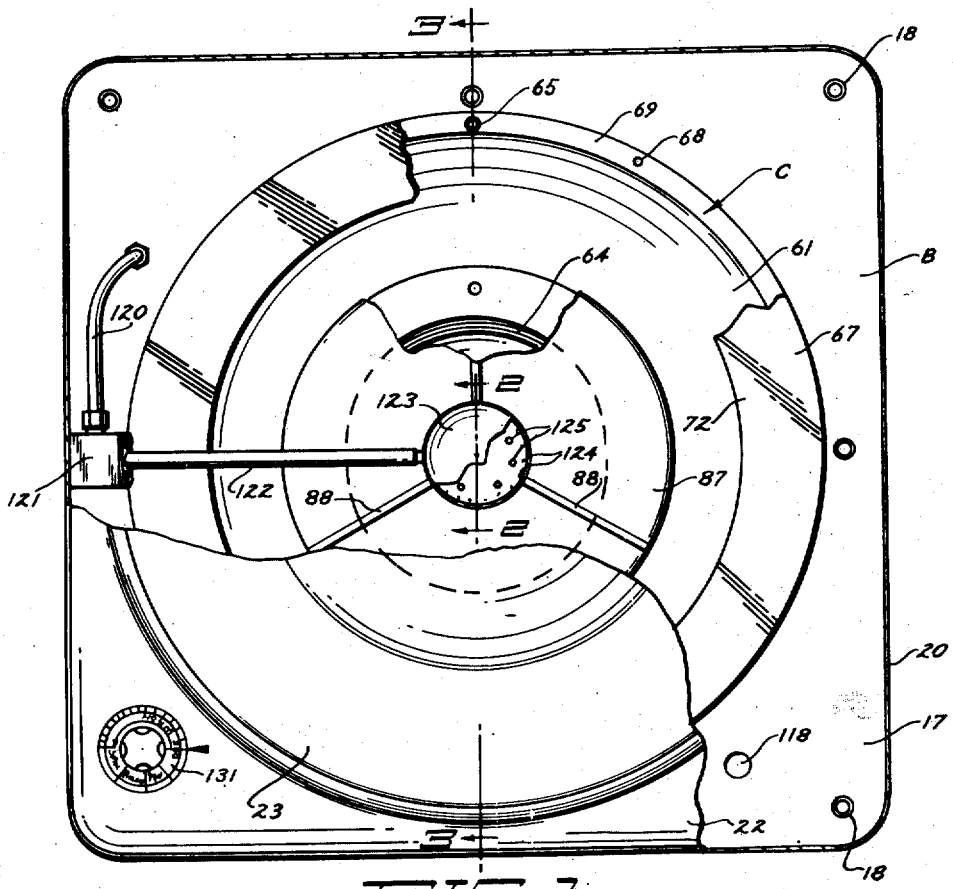
Fig. 1 is a top or plan view of the machine with various parts broken away for purpose of illustration.

Referring to the drawings more particularly and by reference characters A designates a lower housing chamber formed by an upwardly concaved base plate 12, vertical corner irons 13, and a surrounding wall plate 14, the latter of which may be in whole or part readily removed to give access to the mechanism contained within the chamber. This lower construction also includes a four sided angle iron frame 15 providing inwardly projecting ledges 16 and 16a.

Figure 3:
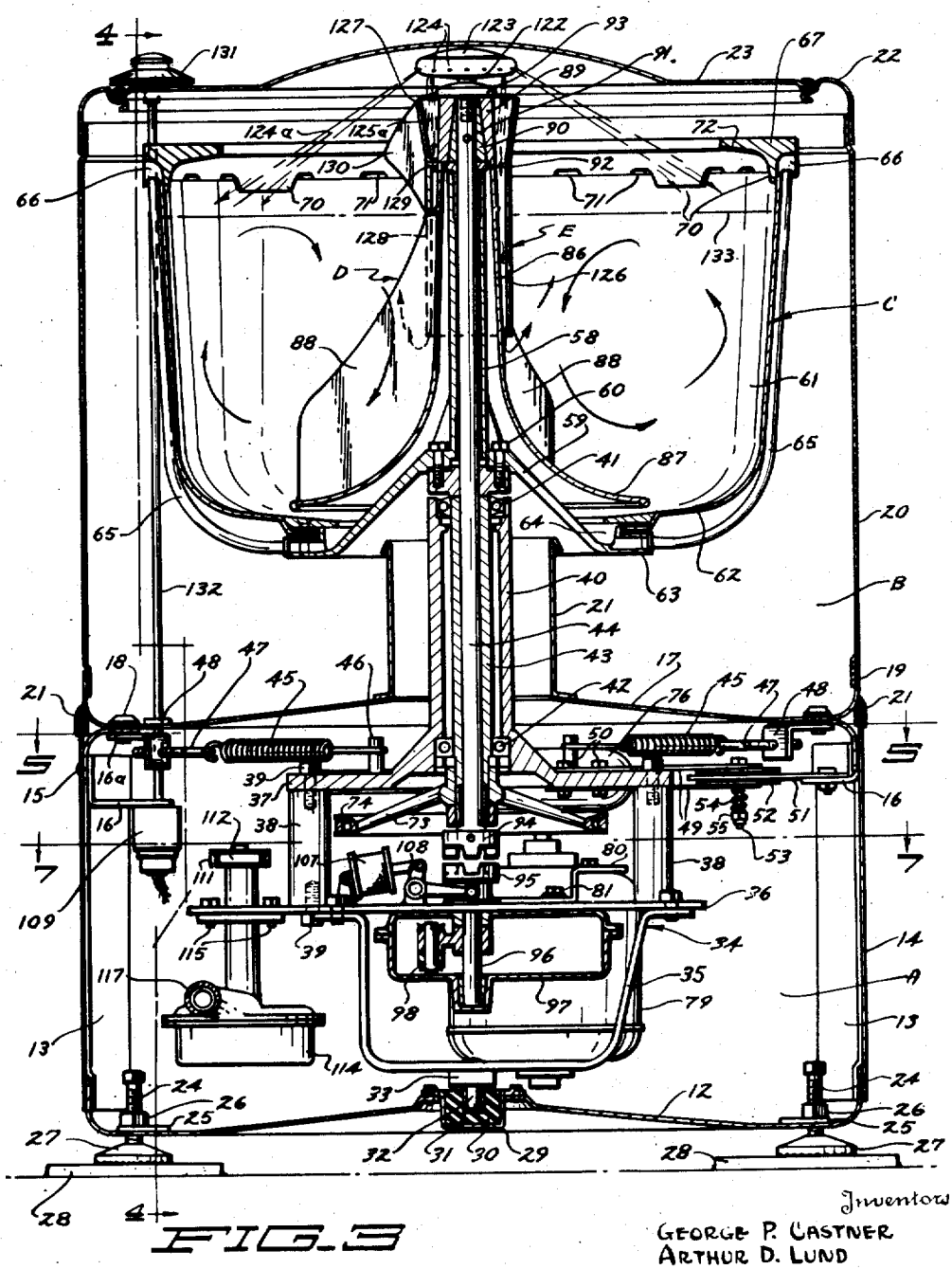
Fig. 3 is a sectional elevation through the machine on line 3—3 in Fig. 1.
Figure 4:
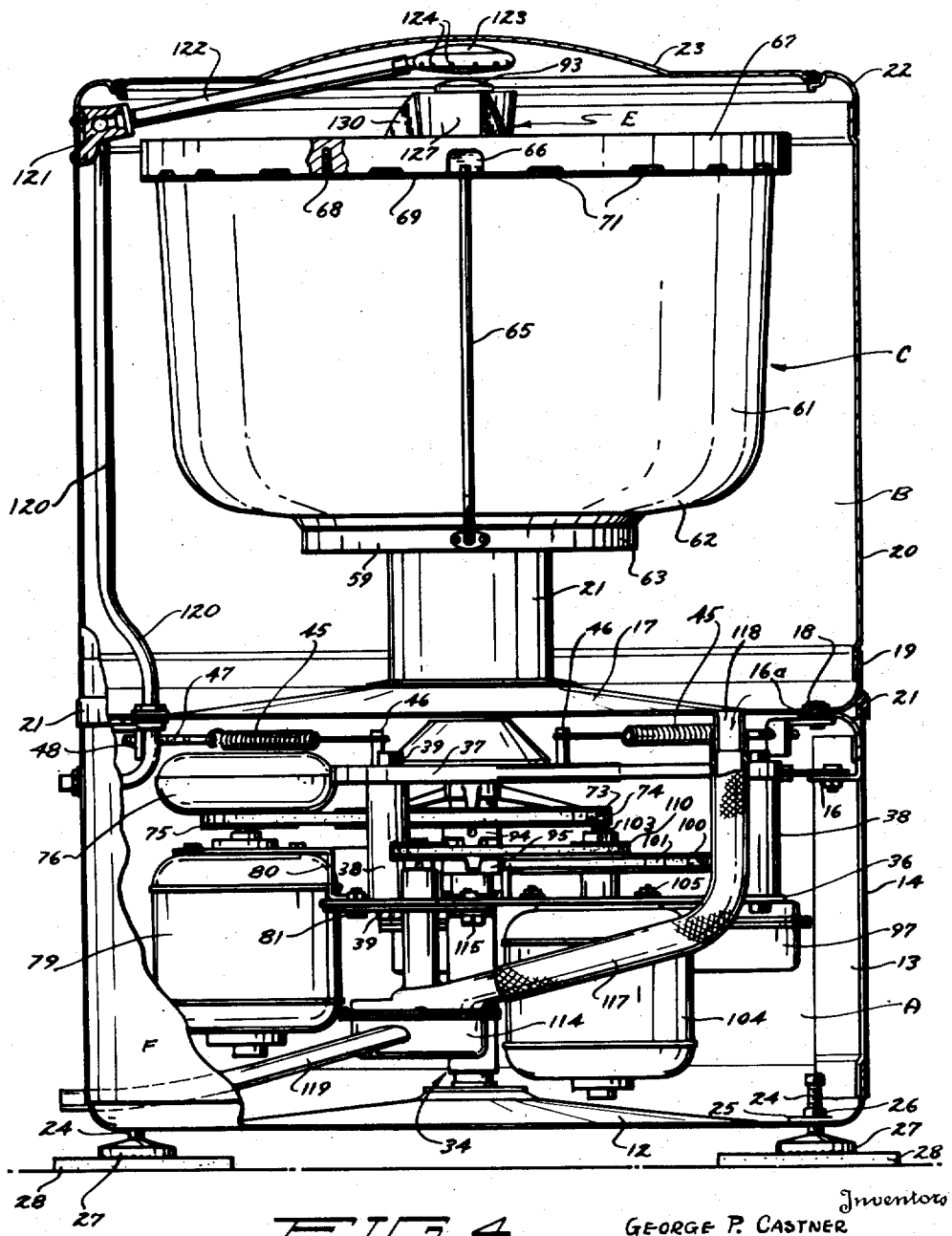
Fig. 4 is an elevation of the machine, as seen on line 4—4 on Fig. 3, or with the major portion of the front housing wall broken away to expose the interior mechanism, and with some parts in section for purpose of illustrating certain details of construction.

The upper housing structure comprises an upwardly concaved bottom plate 17, secured as at 18, to the ledge 16a, and sealed at its upstanding peripheral flange 19 to the casing walls 20 to provide a fluid tight receptacle or chamber B. Extending upwardly from a center opening in the plate 17 is an upstanding sleeve 21, also sealed to the plate, so as to provide the annular water chamber B between itself and the walls 20. The upper edge of the lower casing wall 14 is preferably maintained in fitting contact with the flange 19 by a sealing strip 21 (Figs. 3 and 4). At its upper end the casing 20 has an inwardly curved flange member 22 upon which is seated the circular, removable lid or cover 23.

The washer is supported on four floor jacks which are so designed that they may be adjusted to properly level the machine on an uneven or irregular floor, and will also prevent creeping of the machine due to vibration. Each of these jacks (see Figs. 3, 4, 7, and 8) consists of a vertical bolt 24 threaded in a nut 25 fixed on the base plate 12 and secured by a lock nut 26. The lower end of the bolt has a ball-socket connection to an inverted cup or foot 27 permitting the latter to adjust itself to floor surface irregularities. This cup 27 has a serrated flange resting on and imbedding itself in a rubber or resilient pad 28 which is preferably cemented in proper selected position on the floor. With this construction it will be seen that the machine can be adjusted for equalized four point floor support, while also being cushioned to absorb vibration and sufficiently anchored to prevent creeping.

Figure 11:
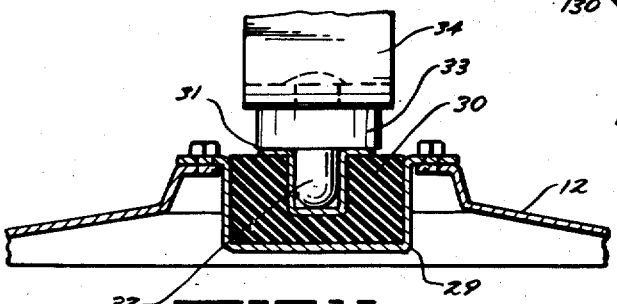
Fig. 11 is an enlarged diametrical section through the center cushion support for the operating assembly.

The washing, rinsing, and centrifuging assembly is supported within the chamber B upon a spindle element projecting upwardly through the sleeve 21 from the operating and transmission assembly contained within chamber A. Both assemblies are primarily supported, as a single unit, upon a single central bearing or cushioned support. This support (Figs. 3 and 11) includes a cup 29, mounted in the plate 12, which, because of its inversely disced shape, provides rigid support, and within the cup there is a rubber block or pad 30 having an inner socket element 31 which releasably receives the lug 32 of a block 33 mounted on the frame 34 of the operating mechanism.

Figure 5:
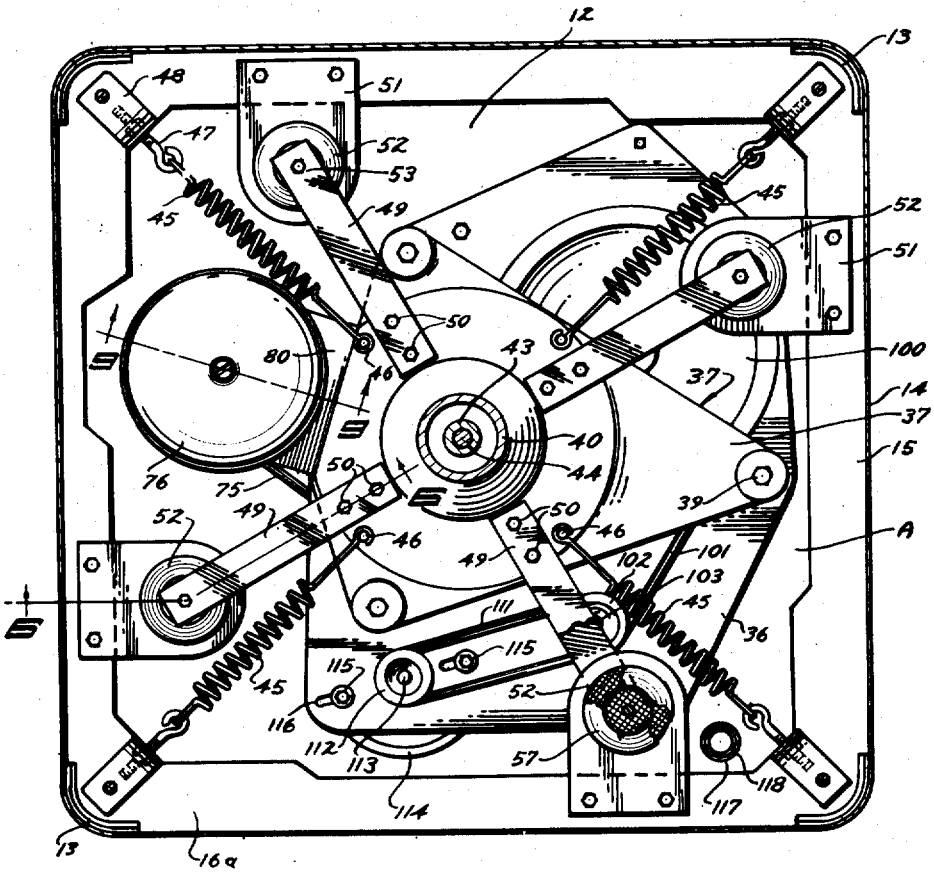
Fig. 5 is a sectional plan view on line 5—5 in Fig. 3.

The frame 34 is composed of rigidly connected parts including a generally U-shaped member 35 (Fig. 3), to which the block is directly fastened, an irregularly shaped plate 36 (Figs. 3, 4, 5, 7, 9), and an upper but also irregularly shaped plate 37 which is secured to the lower plate (36) by three spacers 38 and top screws 39. The plate 37 has an integral, tube extension 40, which projects up within the sleeve 21, with freedom for ample clearance with respect thereto, and this tube 40 has upper and lower antifriction bearing rings 41 and 42, respectively, for centering a spindle 43 (Figs. 3 and 5) having an internal shaft 44.

The frame 34 directly supports the power and transmission mechanism, while the spindle 43 and shaft 44 further and additionally support the tub and washing elements, all of which will presently be described.

As will be evident, the entire combination assembly of frame, operating mechanism, and upper, washer unit will be primarily supported on the central bearing cushion 31, and, as a result, it becomes necessary to provide means for balancing such assembly in its perpendicular or vertical position. This is done by the devices now to be described and which also permit limited radial vibration and gyratory deflection, which is of paramount importance, particularly during the starting and spinning operations, as it operates to absorb vibrations and accommodates the machine to unbalanced load conditions that results when the clothes are not uniformly distributed in the drying receptacle.

Figure 6:
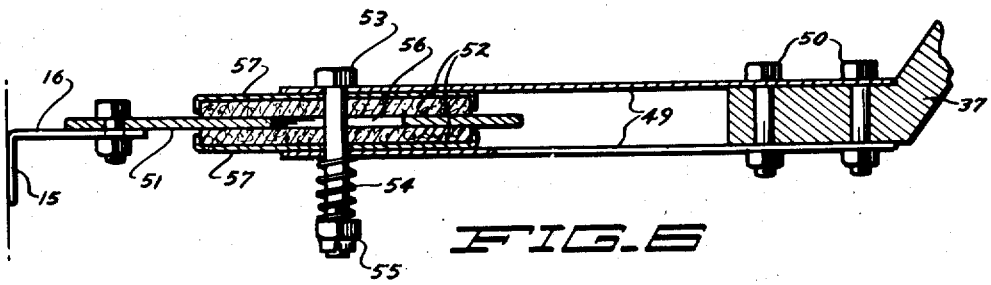
Fig. 6 is an enlarged detail sectional elevation on line 6—6 in Fig. 5.
Figure 7:
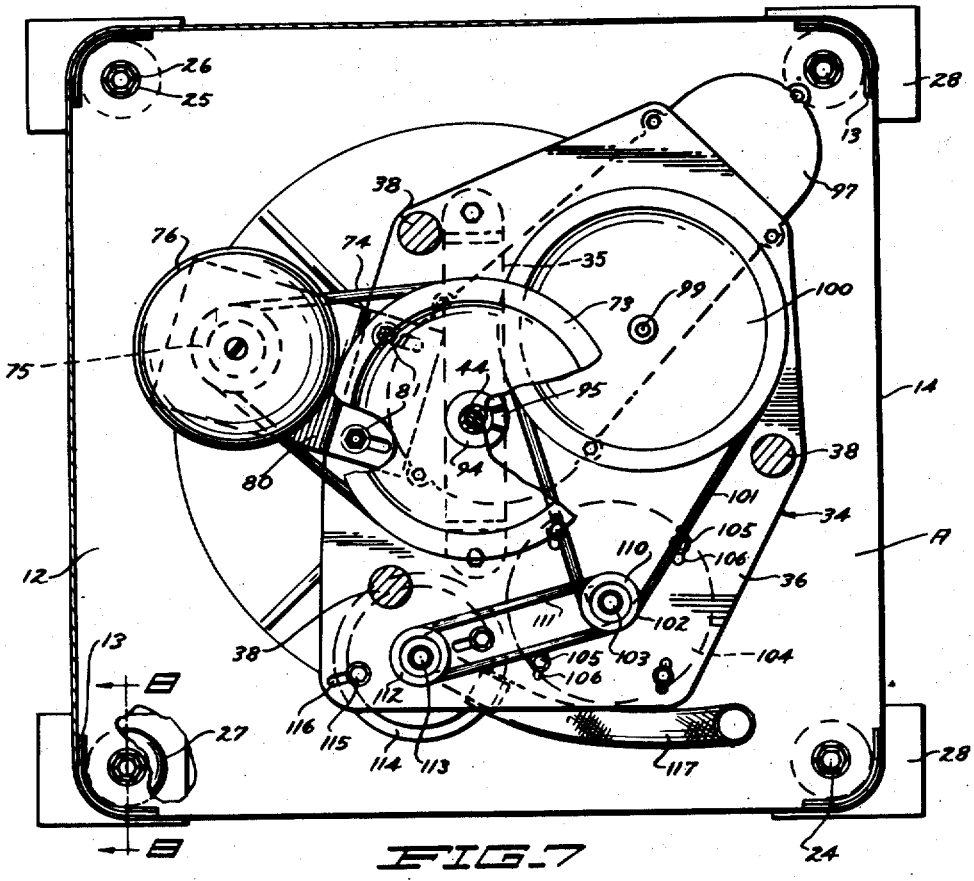
Fig. 7 is a sectional plan view on line 7—7 in Fig. 3.
Figure 8:
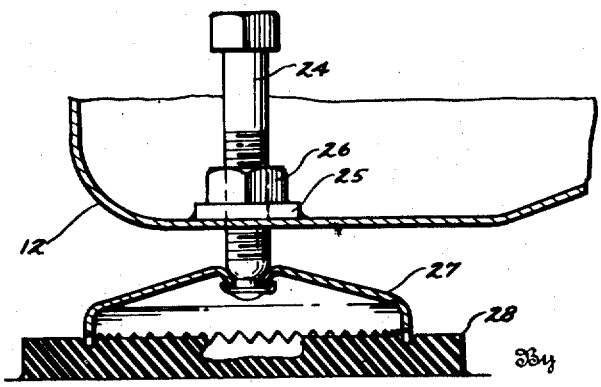
Fig. 8 is an enlarged detail section on line 8—8 in Fig. 7.

To yieldably restrain the assembly in its normal, true vertical position, and to restore it thereto, we provide a series of radial springs 45, the inner ends of which are attached to the plate 37, at points 46, while the outer ends are attached by adjustable eye bolts 47 to corner brackets 48 on the ledge 16a *of the main frame or stationary structure.* In addition, the plate 37 is provided with radially extending pairs of bars or metal straps 49 (Figs. 3, 4, 5, 6), the inner ends of which are anchored rigidly to the plate, by bolts 50, while the other or outer ends frictionally engage bracket plates 51, attached to the ledge 16, through the medium of snubber disks 52. These disks are held in frictional contact with the plates 51 by bolts 53 which also extend through the bars 49, and each bolt has a compression spring 54 disposed between the lower bar 49 and an adjusting nut 55 on the bolt. It will be seen that the bolt opening, 56, in the plate 51 (Fig. 6) is relatively large so as to permit horizontal movements of the bars 49, disks 52, and plate 37 with respect to the plates 51, and it may further be noted that while the disks 52, of leather, fiber or other composition material, have direct face contact with the plate 51, their surfaces adjacent the bars 49 have flanged metal covers or washers 57 to insure proper retention of the disks with respect to the bolts 53 and bars 49.

*The foregoing constrution not only functions to yieldably support and center the spinner assembly in upright position but provides means for dampening the vibrations that would otherwise be imparted to the main frame due to gyratory deflections of the clothes receptacle when out of balance. This centering and dampening action is particularly effective because it acts directly on the spindle element 43, and, by being directly under the outer fluid receptacle chamber B, is located as close as practicable to the gyrating center of mass.*

The clothes receptacle, C, comprises an axial sleeve 58 terminating, at its lower end, in a conical section 59 that is rigidly secured to the top of the spindle 43 by bolts 60. The receptacle wall, 61, is imperforate throughout and has a slightly tapered, downwardly curved bottom flange 62 that is secured in tight sealing engagement upon the outer rim 63 of the conical part 59. The base portion of the cone 59 has an elliptical trough or sediment trap 64 (Figs. 1 and 3), into which sand and other sediment from the tub C will settle, and this sediment is carried off by the tubes 65, during the centrifuging operation as shown and claimed more specifically in application Serial No. 636,304, filed Dec. 21, 1945, by the present applicant George P. Castner and now Patent Number 2,470,140, May 17, 1949.

The upper ends of the tubes 65, in the present instance, discharge into outwardly flared deflector pockets 66 (Figs. 3 and 4), in what is designated as a balancing ring 67. This ring is preferably of heavy cast material and is secured by top screws 68 to the flange rim 69 of the tub C (Figs. 1 and 4). The ring is also provided with inset lugs 70, to engage the inner surface of the tub wall (Fig. 3), and between these lugs are openings 71 through which the fluid is expelled from the tub into the chamber B during the centrifuging operation. The ring 67 has an inwardly directed flange 72 to prevent the upward escape of clothes from the tub during the drying or spinning action thereof. Another and very important function of the ring is to counteract the tendency of the tub to rotate eccentrically, with respect to a true vertical axis, under an unbalanced load. Thus the weight of the ring not only in itself tends to stabilize the rotation but will further tend to correct "throw" because of the fact that any tilting of the spindle axis from bearing center 32 will correspondingly tilt or wobble the ring, and, as is well known, the centrifugal force or momentum imparted will set up a gyroscopic action and tend to restore the body to its correct axis of rotation. This effect is enhanced by the height at which the ring is located above the point 32, since the ring is on top of the receptacle and as far above point 32 as the size of the casing will permit.

In addition to its important balancing function the use of the ring 67 actually greatly facilitates the manufacturing process since the tub or receptacle C need not have its walls perforated, thus adding an operation which has frequently given trouble due to distortion of the metal etc., nor need the tub walls be turned or formed in to hold the clothes. Instead the ring as it is cast is formed in the one single operation with the water escape openings 71 and the flange 72 to hold the clothes with a considerable saving in expense and time.

Figure 9:
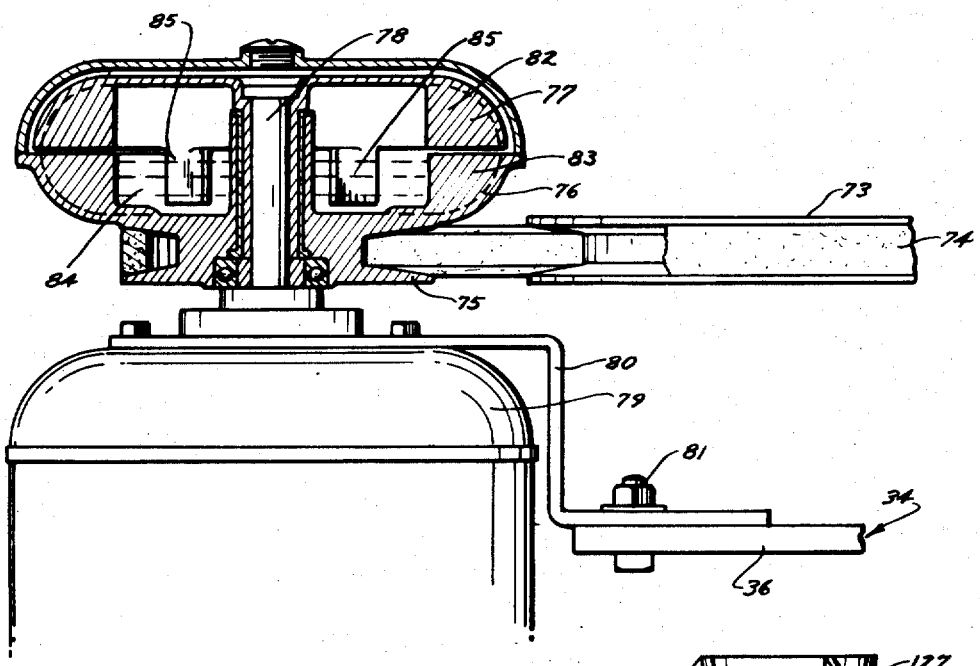
Fig. 9 is an enlarged sectional detail elevation through the fluid drive transmission, or as seen substantially on the line 9—9 in Fig. 5.
Figure 10:
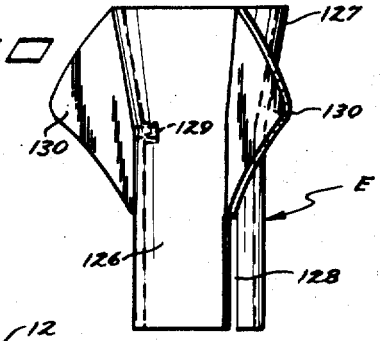
Fig. 10 is an enlarged detail elevation of the baffle tube removed from the agitator assembly.

The tub C is rotated by the spindle 43, on which it is mounted, and the latter is provided, at its lower end, with a pulley 73 driven by a belt 74 from a pulley 75 on the driven member 76 of a fluid coupling which also includes a driving member 77 (Fig. 9). The member 77 is mounted on the vertical shaft 78 of an electric motor 79 carried by a bracket 80 that is adjustably secured, as at 81, to the frame plate 36.

The fluid coupling 76–77 is of the Fottinger or turbine type, through which power is hydraulically transmitted by opposed, annularly spaced series of blades 82 and 83, but since the axis of the unit is vertically disposed, in the present instance, it will be seen that when the coupling is idle (as in Fig. 9) the power transmission fluid 84 is contained entirely within the driven member, 76, and does not therefore contact the vanes or blades 82 of the driving member as would normally occur when the coupling axis is horizontal. Consequently rotation of the driving member 77 would not initiate the fluid turbulence or circulation that is essential to this type of power transmission. For that reason the driving member 77 is provided with paddle extensions 85 that project down into the fluid body within the inner edges of the blades 83 so as not to contact the latter. With this arrangement it will be seen that rotation of the member 77 will cause the extensions 85 to act on the fluid sufficient to initiate and maintain the toroidal circulation required for power transmission. In addition to this novel feature the fluid coupling cooperates as a unit to reduce "throw" or eccentric vibration during centrifuging in a manner [later to be] set forth *in detail in United States Patent No. 2,513,845, issued July 4th, 1950, to George P. Castner, one of the present applicants.*

The actual clothes washing operation within the tub C is accomplished in somewhat conventional manner, by an oscillating agitator D (Fig. 3), made up of a tubular sleeve 86, flared out at its bottom, in a skirt 87, and having integrally formed, radial agitator blades 88. The skirt edge 86 is spaced above and extends beyond the trap 64 so that sediment may escape downward and inwardly to the trap.

The upper end of the sleeve 86 has an integral hub 89 with an axial socket which is upwardly tapered and square or hexagonal in cross section to fit snugly upon a similarly shaped plug 90 that is secured upon the upper end of shaft 44 by a pin 91. Between the plug 90 and spindle 58 is a flanged bushing 92 that serves as a bearing between the shaft 44 and spindle 58. The agitator D is held down in place upon the plug 90 by a cap 93 having a shank threaded into the end of the shaft. By removing the cap 93 the agitator can, of course, easily be removed and replaced.

The lower end of the shaft 44 has a vertically stationary clutch part 94 adapted to be engaged and disengaged by a complemental clutch member 95, which is slidably keyed to a shaft 96 journaled in a transmission casing 97. The shaft 96 is oscillated by a linkage mechanism 98 which is not shown in detail but may be of the type shown and described in Patch Patent No. 1,964,440, issued June 26, 1934. This mechanism is actuated by a shaft 99 which is rotated in the housing, and which mechanism converts the rotary motion [to] *of* the shaft to reciprocating motion of the shaft 96. The shaft 99 projects upwardly from the casing 97 to support a pulley 100, driven by V-belt 101 from a smaller pulley 102, on the shaft 103 of a motor 104. This motor is adjustably secured, as by bolts 105 and slots 106, to the plate 36, in a manner permitting tension adjustment of the belt.

The clutch 94—95 is normally open or separated, as in Fig. 3, but is closed or engaged by energization of a solenoid 107 that operates a shipper lever 108. This is done automatically by an electric timer 109 as will presently be described.

The shaft 103, of motor 104, carries a second pulley 110, which operates a V-belt 111 to drive a pulley 112 on the shaft 113 of a centrifugal pump 114. This pump is adjustably secured to the plate 36 by bolts 115, in slots 116, which are so arranged that adjustments can be made to slacken or righten the belt 111 as may be required. The inlet side of the pump is connected by a conduit 117 to a drain spout 118 of the chamber B, and since the pump is subject to vibration with respect to the casing this conduit is preferably of flexible tube or hose material. The outlet side of the pump is connected to a flexible conduit 119 for discharging used fluid to a convenient point outside the casing.

Washing and rinsing water is introduced to the machine by a pipe or tube 120 which preferably extends in through a side wall of the casing 14, and thence upwardly through the bottom plate 17 and to a coupler 121 (Figs. 1 and 4). A second pipe 122, is detachably secured to the coupler 121 and extends inwardly and slightly upwardly, terminating in a spray head 123 which it supports in an axial position over the tub C and slightly spaced above the cap 93. Exteriorly of the machine the pipe 120 is adapted for connection with one or more mixing valves (not shown) so that water of desired temperature and volume may be supplied to the spray head 123.

Figure 2:
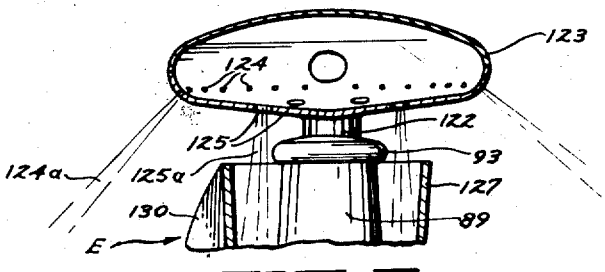
Fig. 2 is an enlarged detail section of our improved spray nozzle, as on line 2—2 in Fig. 1.

The spray head 123 is of hollow form and has two annular series of perforations 124 and 125. The circle of perforations 124 produces a wide conical spray 124*a* (Figs. 2 and 3), while the circle of perforations 125 produces a generally cylindrical form of downward spray 125a. The purposes of the sprays will be set forth in the description of the operation of the machine.

As an important element of the present invention we have provided what may be conveniently referred to as a baffle unit E, as shown in Figs. 2, 3, 4, and 10. This unit consists of a cylindrical tube 126 the top end of which is flared, as at 127, while the lower portion is longitudinally slotted, at 128, to permit the unit to be moved vertically down into place about the sleeve 86 and with the slots 128 receiving the agitator blades 88. The unit is releasably secured to the sleeve hub 89 by a set screw 129 which holds the tube in annularly spaced position with respect to the sleeve for the passage of water downwardly therebetween. The upper section of the unit E is further provided with a series of radial fins or vanes 130, the function of which will presently be set forth.

The timer 109 which controls the electric current to the two motors 79 and 104 and to the solenoid switch 107 is of conventional or standard design, well known in the art, and consequently neither it nor the wiring diagram is shown in detail. It is sufficient to note that in the present instance a start and stop switch for the timer may conveniently take the form of a dial 131, mounted on top of the machine and connected to the timer by rod 132. This dial (Fig. 1) can be set to control the duration of the washing operation but thereafter the extracting, rinsing and drying operations automatically follow at predetermined time intervals. It will also be understood that the timer may operate to control the sequence and supplies of hot and cold water in synchronism with the motor actuating so that once started the machine can function to complete the entire operation without manual adjustment of intervention.

*Operation*

To wash, rinse and dry a batch of clothes the nature and cycle of the various operations, together with the various advantages flowing from the present construction, may be described as follows:

The desired amount of clothes and soap are placed in the tub C, and water of the required temperature is then filled in (under manual valve control) through the pipes 120 and 122, and spray head 123, until it reaches the predetermined water level line 133 (Fig. 3). The lid or cover 23 is then closed and the dial 131 is set, by turning it to the desired number of wash minutes. The dial is then lifted to start the timer which closes the circuit to motor 104 and solenoid 107 to close clutch 94—95. The motor 104 then drives the pump 114 through belt connection 111, and operates belt 101, transmission mechanism 98 and clutch 94—95, to oscillate the shaft 44 and agitator D secured thereon. The resulting washing process, as such, is of the well known action in which the agitator impellers 88 impart a turning or toroidal movement to the suspended clothes to subject the latter to constant contact with currents of the soapy water until clean. During this step of the process any grit, sand or other heavy foreign matter will find its way into the sediment trap 64, while any fluid or suds splashing over the tub and into the casing chamber B will be drawn off through the drain 118 by the pump 114 which is constantly running.

A feature preferably reserved for the rinsing operation but which may also be used in the washing step consists of opening the water supply to the spray head 123 toward the end of the washing period. When this is done the water surface is raised above the level of line 133 and up to that of the openings 71. The water from spray 125a flows up from the lower edge of the baffle tube E, as indicated by the arrows in Fig. 3, and the wider spray, 124a, acts outwardly against the upper surface. The combined spray action has a tendency to stop or retard the normal rolling or tumbling rotation of the clothes and the spray 124a acts to push the surface scum outwardly through the holes 71 and thus remove it from further contact with the clean clothes. This action is supplemented by the fins 130, of the baffle unit, which fins are now operating below the level of the increased body of water and tend to fan or impel outwardly the scum disposed within the spray 124a. This descumming step may be by either manual or automatic control.

When the washing operation is completed the solenoid 107 is deenergized to disconnect the clutch 94—95 which in turn stops the oscillations of the agitator D, while the motor 104 continues to operate the pump 114.

The motor 79 is then energized and has as its sole function to spin the receptacle C through belt 74, pulley 73 and spindle 43, to partially dry the clothes. It will be understood that under this centrifuging action the water will be forced outwardly to the wall 61 of the receptacle and will then flow upwardly along the tapered wall until it reaches the escape ports 71 from which it will be discharged into the chamber B for prompt removal by the pump 114. It will also be noted that the inner flange 72 of the balancing ring will prevent the upward escape of clothes during the centrifuging, while the elliptical form of the sediment trap and the arrangement of pipes 65 will cause centrifugal flushing and discharge of any foreign matter that has settled in the trap.

During the first spinning operation, which may be maintained for approximately five minutes it may be found desirable to give the clothes one spray flushing with hot water. In any event, and when the cleaning fluid has been substantially removed, the spinning motor (79) is deenergized, cold rinse water is supplied to the tube, and the clutch 94—95 is re-engaged to again activate the agitator D. After rotational tumbling of the clothes is now sufficient to insure proper rinsing the clutch is again disengaged and the spinning motor is again operated to dry the clothes, for hanging or ironing.

In all washing machines employing centrifugal drying a substantial problem arises because of vibration resulting from unbalanced loads in the centrifuging process. To prevent tipping, creeping, noise, wear, wear, etc. resort has been made to various "cures" including that of bolting the machine to the floor, which is frequently impractical and expensive. In the present instance a combination of features complement each other to absorb and prevent vibration to a point where it is sufficiently controlled to be unobjectionable from a practical and operative standpoint. Thus it will first be noted that the adjustable corner jacks 24—26 provide means for initially leveling the machine while the serrated foot and pad arrangement 27—28 is such as to provide a resilient pad on which the feet 27 cannot creep.

Of greater importance, however, is the single, cushioned, pivot support 32 for the entire operating assembly coupled with the radial balancing springs 45, and the *dampener* snubbers 52, connected by the flexible arms 49, the balancing ring 67, and the hydraulic drive coupling 76—77, all of which cooperate to reduce vibration to an unobjectionable minimum.

The single point support (32) for the entire assembly is such that gyratory deflections of the clothes receptacle C will not be directly transmitted laterally to the casing 20, and, since the pivot connection 32 acts as a fulcrum for such deflections, the amount of transmitted vibration at this low point is negligible. The off-center or eccentric vibrations that are imparted to the frame plate 37 are frictionally retarded by the snubbers *or dampeners*, while the centering springs 45 immediately tend to restore the assembly to its true vertical condition. In this manner the spring and snubber devices yieldably transmit only such vibration forces to the outer frame and casing as the latter can easily resist or absorb, and it may be noted that since the snubber arms 49 are flexible the disks 52 will always have flat friction contact with the bracket plates 51. It is further to be noted that the snubbers and springs are equally effective to absorb torsional stresses about a vertical axis to which the assembly is subjected in starting and stopping operations.

The stabilizing effect imparted by the weight and momentum of the ring 67 has already been described, and, of course cooperates with the other anti-vibration factors to provide a smooth running of the machine even with out-of-balance load conditions.

The fluid drive coupling 76—77 not only permits the motor to attain full speed and thus avoid overloading, when starting the relatively heavy clothes receptacle spinning, but also provides slippage in the drive connection that will slow up the speed of receptacle rotation when it reaches a point where off-balance eccentric throw might be objectionable or harmful. This is due to the increased load on the fluid drive which is set up when the tub load becomes unbalanced, and which increased load increases slippage in the fluid drive. This slippage may in turn be governed or determined by the amount of fluid 84 in the coupling, as the slippage between driving and driven members 77 and 76, will increase or decrease by respectively decreasing or increasing the amount of fluid. Thus, it will be apparent, that with any load an increase in speed will result in greater eccentric throw, and increased frictional resistance, or increased driving power, so that the slippage of the fluid drive can be set to limit the receptacle rotation below that which might otherwise be objectionable.

The construction of the parts forming the chamber B is such that there is ample room to accommodate a complete receptacle load of fluid and particularly so with the pump drawing it off during the rapid discharge of fluid from the upper edge of the receptacle. Thus the chamber is in effect open-topped, and the sleeve 21 renders unnecessary any seal between the chamber and spindle, while also being sufficiently large to permit full clearance for the sleeve 40 even under maximum vibration conditions.

It is understood that suitable modifications may be made in the general design and structural details of the machine as hereinabove set forth without departing from the spirit and scope of the appended claims. Having now therefore fully illustrated and described our invention what we claim to be new and desire to protect by Letters Patent is:

1. In a washing machine, a clothes receptacle mounted for rotation about a vertical axis and having an upwardly flared [imperforate] outer wall *imperforate over its entire area* whereby water will rise, upon spinning of the receptacle, and escape outwardly over the upper edge of the wall, means for rotating the receptacle, and a heavy balancing ring mounted upon *and straddling* the upper edge of the receptacle, said ring projecting inwardly to restrain clothes in the receptacle from escape upwardly therefrom during the spinning operation, the said ring having openings *above the upper edge of the receptacle* to pass the water outward during the spinning operation.

2. In a washing machine, a casing having an upper chamber, a clothes receptacle in the chamber and adapted upon being rotated to discharge fluid into the chamber, an agitator in the receptacle, a pump for draining the chamber, a motor and a fluid drive coupling for spinning the receptacle, a second motor for operating the agitator and pump, and a clutch for controlling the power connection from the second motor to the agitator.

3. In a cothes treating machine, a rotary and gyratory receptacle for clothes and treating liquid, the said receptacle having an upwardly flaring [imperforate] wall *imperforate over its entire area,* means for spinning the receptacle to drive the fluid up the wall and to extract the fluid from the clothes, a balancing mass mounted around the upper edge of the receptacle wall *with the major portion thereof extending above the wall and in vertical alignment therewith,* and the said balancing mass having openings therein *above the upper edge of the imperforate wall* to pass the liquid outwardly as it moves up the receptacle wall.

4. In a clothes treating machine, a rotary and gyratory receptacle for clothes and treating liquid, the said receptacle having an upwardly flaring [imperforate] wall *imperforate over its entire area,* means for spinning the receptacle to drive the fluid up the wall and to extract the fluid from the clothes, a balancing mass mounted around the upper edge of the receptacle wall, and the said balancing mass having openings therein *adjacent its lower end and above the upper edge of the imperforate wall* to pass the liquid outwardly as it moves up the receptacle wall, the said balancing mass also having an inwardly turned annular part to hold the clothes in the receptacle.

5. In a clothes treating machine, a rotary and gyratory receptacle for clothes and treating liquid, the said receptacle having an upwardly flaring [imperforate] wall *imperforate over its entire area,* means for spinning the receptacle to drive the fluid up the wall and to extract the fluid from the clothes, a balancing mass mounted upon the upper edge of the receptacle wall, and the mass having notches in its underside forming openings above the receptacle edge for the escape of the liquid.

6. In a washing machine, a main frame *having an outer casing and a support member disposed at the lower end of the casing,* [a second frame] *an inner assembly including a spindle* supporting a clothes receptacle for rotation about a vertical axis, means for mounting [the second frame on] *said assembly on the support member of* the main frame with freedom for gyratory deflection with respect ot said vertical axis induced by rotation of the receptacle when the latter is out of balance, *spring* means *disposed at an elevation substantially above said support member and connecting the main frame and inner assembly for* yieldably restraining such gyratory deflection and tending to restore the [second frame] spindle and receptacle to normal operating positions, and at least one pair of cooperating friction producing members *disposed at an elevation adjacent to that of the spring means* for frictionally resisting the aforesaid gyratory deflection, one of the members of said pair being attached to a point fixed with respect to the main frame and the other member of the pair being attached to [the second frame] *said inner assembly* [.], *said members overlapping each other and means interengaged with said members intermediate the overlapped ends and centrally within the frictional areas thereof for retaining the members in assembled relation.*

7. In a washing machine, a frame, *a casing enclosing the frame and having upper and lower chambers separated by a generally horizontal centrally apertured partition,* a rotatable clothes receptacle *in the upper chamber, spindle* means *supported in the lower chamber below the partition and extending upwardly through the partition aperture* for mounting the receptacle with respect to the frame for rotation about a vertical axis but with freedom for limited gyratory deflection with respect to the axis, means *attached*

*to the underside of said partition and acting on the spindle for* yieldably resisting said gyratory deflection and tending to restore the receptacle, when deflected, to operating position coincident with said vertical axis, additional means for resisting said gyratory deflection comprising a first member fixed with respect to the receptacle axis but non-rotatable with the receptacle, a second member anchored to an element fixed with respect to the frame, said first and second members having opposed friction surfaces and being connected by means permitting the members to move relatively to each other when pressure on such first member produced by gyratory deflection exceeds the resistance produced by such friction [.], *said members overlapping each other and means interengaged with said members intermediate the overlapped ends and centrally within the frictional areas thereof for retaining the members in assembled relation.*

8. In a washing machine having a main frame *with an outer casing provided with upper and lower chambers separated by a horizontal plate member,* a clothes receptacle *arranged in the upper chamber and* having a spindle supporting the receptacle for rotation about a vertical axis, [a second frame forming a bearing support for the spindle] *said spindle extending down through an aperture in the plate member and into the lower chamber,* means for mounting the lower end of the [second frame] *spindle* on the main frame for limited tilting action *about a pivot in the lower part of the lower chamber* whereby the [second frame] spindle may gyrate in response to gyratory deflection of the clothes receptacle about said vertical axis, *the aperture in the plate member being larger than the adjacent outer diameter of the spindle to permit horizontal movement of the spindle therein when the spindle is tilted on said pivot, spindle supporting means disposed about the said spindle adjacent said horizontal plate member,* a first friction member attached to [and extending outwardly from] the [second frame] spindle *supporting means* at an elevation below the clothes receptacle and above the lower end of the [second frame] *spindle,* a second friction member connected with and extending inwardly from a stationary point of the main frame to frictionally overlap a surface of the first friction member, and resilient means *interengaged with the overlapped ends of the friction members with the friction surfaces of said members surrounding said resilient means, and said resilient means* urging the two friction members into yieldable contact with each other.

9. In a washing machine having a main frame *including an outer casing having upper and lower chambers separated by a generally horizontal plate member,* a clothes receptacle *disposed in the upper chamber and* having a spindle supporting the receptacle for rotation about a vertical axis, *said spindle extending down through an opening in the plate member and into the lower chamber,* a second frame *in the lower chamber* forming a bearing support for the spindle, means for mounting the lower end of the second frame on the main frame for limited tilting action whereby the second frame may gyrate in response to gyratory deflection of the clothes receptacle *and spindle* about said vertical axis, *the opening in the plate member being larger than the adjacent outer diameter of the spindle so that the latter may move horizontally therein about the tilting axis of the second frame therebelow* during such gyration, a first friction member attached to and extending outwardly from the second frame at an elevation below the clothes receptacle and above the lower end of the second frame, a second friction member connected with and extending inwardly from a stationary point of the main frame to frictionally overlap a surface of the first friction member, and adjustable means [for] *interengaged with the overlapped ends of the friction members with the friction surfaces of said members surrounding said adjustable means and said adjustable means* controlling the degree of frictional resistance between the two friction members.

10. In a washing machine having a main frame, a clothes receptacle having a spindle supporting the receptacle for rotation about a vertical axis, a second frame forming a bearing support for the spindle, means for mounting the lower end of the second frame on the main frame for limited tilting action whereby the second frame may gyrate in response to gyratory deflection of the clothes receptacle about said vertical axis, a first friction member attached to and extending outwardly from the second frame at an elevation below the clothes receptacle and above the lower end of the second frame, a second friction member connected with and extending inwardly from a stationary point of the main frame to frictionally overlap a surface of the first friction member, and resilient means *interengaged with the overlapped ends of the friction members with the friction surfaces of said members surrounding said resilient means, said resilient means* urging the two friction members into yieldable contact with each other, one of said friction members being provided with a friction lining for surface engagement with the other friction member.

11. In a washing machine, a main frame, a bearing frame tiltably supported at its bottom on the main frame so that the upper part of the bearing frame may gyrate, a spindle journaled in the bearing frame for rotation about an upright axis, a clothes receptacle carried by the upper end of the spindle, a motor carried by the bearing frame and connected to the spindle to rotate the spindle and receptacle, a series of elements fixed with respect to the main frame at spaced locations about the bearing frame and presenting generally horizontal bearing faces, a second series of elements attached to the bearing frame and having portions [disposed adjacent to] *overlapping and enclosing* said bearing surfaces, said second element portions having linings for frictionally engaging the bearing surfaces, and means [for] *interengaged with the overlapped ends of said elements with the friction surfaces of said elements surrounding said means and said means* controlling the frictional resistance between said linings and bearing surfaces.

12. In combination, an outer main frame *including an upper stationary receptacle the bottom of which has a central opening,* a second frame disposed within the main frame [and] *below said receptacle bottom and having a spindle extending up through said opening for* supporting a clothes receptacle for rotation about a normally upright axis, means for mounting the second frame *upon a stationary fulcrum support* in the *lower end of the* main frame with freedom for gyratory deflection with respect to said axis induced by rotation of the *clothes* receptacle when the latter is out-of-balance, *said bottom opening being larger than the spindle part therewithin so as to permit the spindle to tilt therein when the second frame*

*gyrates on said stationary fulcrum support,* [resilient means] *tension springs* connecting the two frames *immediately under said receptacle bottom* and tending to yieldably resist such deflection of the second frame, at least one pair of friction resistance elements, one of which is attached to the main frame and the other of which is attached to the second frame, said elements *overlapping each other and* having coacting friction surfaces, and means [for] *interengaged with said overlapping elements with the friction surfaces surrounding said means and said means* urging said surfaces into frictional contact with each other.

13. In combination, an outer main frame *having a stationary receptacle at its upper end, the bottom of said receptacle having a central opening and an upstanding sleeve thereabout,* a second frame disposed within the main frame *below the receptacle and having a tubular portion extending upwardly through said sleeve with freedom for lateral swinging movement therein, a spindle journaled in said tubular portion* [and] *for* supporting a clothes receptacle *in the stationary receptacle* for rotation about a normally upright axis, [means] *a stationary fulcrum support at the lower end of the main frame* for mounting the second frame in the main frame with freedom for gyratory deflection with respect to said axis induced by rotation of the *clothes* receptacle when the latter is out of balance, [resilient means] *springs* connecting the two frames *immediately below the stationary receptacle bottom to exert outward radial pull on the second frame* [and tending] to yieldably resist such deflection of the second frame, at least one pair of friction resistance elements, one of which is attached to the main frame and the other of which is attached to the second frame, said elements *overlapping each other and* having coacting friction surfaces, and adjustable spring means [for] *interengaged with said overlapping elements with the coacting friction surfaces of said elements surrounding said adjustable spring means and said adjustable spring means* squeezing said friction resistance elements together.

14. In a washing machine, an outer frame, an inner frame mounted in the outer frame with freedom for limited gyratory movements about a bottom support in the outer frame, a clothes receptacle mounted for rotation on the inner frame, and a motor for driving the receptacle, a series of bracket plates mounted on the outer frame at spaced points around the inner frame, a series of members secured to the inner frame and extending outwardly over *and enclosing* the surfaces of the bracket plates for frictional engagement with surfaces thereof and for movement thereover to resist the aforesaid gyratory movements of the inner frame, and means *interengaged with said bracket plates and members* for controlling the degree of frictional resistance between said members and bracket plates [.], *said bracket plates having slotted openings therein covered by said members and said means including variably tensioned bolts extending through said members and the slots in said bracket plates.*

GEORGE P. CASTNER.
ARTHUR D. LUND.

REFERENCES CITED

The following references are of record in the file of this patent or the original patent:

UNITED STATES PATENTS

| Number | Name | Date |
|---|---|---|
| 288,129 | Storey | Nov. 6, 1883 |
| 430,632 | Doremus | June 24, 1890 |
| 1,647,992 | Hartman | Nov. 8, 1927 |
| 1,847,159 | Adams | Mar. 1, 1932 |
| 1,886,112 | Luarde | Nov. 1, 1932 |
| 1,932,246 | Kirby | Oct. 24, 1933 |
| 2,033,146 | Motycka | Mar. 10, 1936 |
| 2,091,536 | Van Impe | Aug. 31, 1937 |
| 2,120,139 | Tholl | June 7, 1938 |
| 2,222,329 | Watts | Nov. 19, 1940 |
| 2,282,847 | Bariff | May 12, 1942 |
| 2,291,088 | Morganstern | July 28, 1942 |
| 2,303,979 | Blake | Dec. 1, 1942 |
| 2,331,897 | Dyer | Oct. 19, 1943 |
| 2,334,858 | Beattie | Nov. 23, 1943 |
| 2,346,158 | Dyer | Apr. 11, 1944 |
| 2,356,818 | Bruckman | Aug. 29, 1944 |
| 2,366,236 | Clark | Jan. 2, 1945 |
| 2,380,595 | Hertrich | July 31, 1945 |
| 2,408,509 | Clark | Oct. 1, 1946 |
| 2,421,803 | Neal | June 10, 1947 |